(12) United States Patent
Tsuji

(10) Patent No.: US 9,507,058 B2
(45) Date of Patent: *Nov. 29, 2016

(54) VIEW ANGLE-RESTRICTING SHEET AND FLAT PANEL DISPLAY

(71) Applicant: KEIWA INC., Osaka (JP)

(72) Inventor: Takahiro Tsuji, Osaka (JP)

(73) Assignee: KEIWA INC., Osaka (JP)

( * ) Notice: Subject to any disclaimer, the term of this patent is extended or adjusted under 35 U.S.C. 154(b) by 61 days.

This patent is subject to a terminal disclaimer.

(21) Appl. No.: 14/395,312

(22) PCT Filed: Apr. 22, 2013

(86) PCT No.: PCT/JP2013/061809
§ 371 (c)(1),
(2) Date: Oct. 17, 2014

(87) PCT Pub. No.: WO2013/161771
PCT Pub. Date: Oct. 31, 2013

(65) Prior Publication Data
US 2015/0205015 A1    Jul. 23, 2015

(30) Foreign Application Priority Data

Apr. 23, 2012  (JP) ................................. 2012-097733
Apr. 19, 2013  (JP) ................................. 2013-088088

(51) Int. Cl.
*G02B 5/02* (2006.01)
*G02B 13/20* (2006.01)
(Continued)

(52) U.S. Cl.
CPC ....... *G02B 5/0242* (2013.01); *G02F 1/133504* (2013.01); *G02F 1/133524* (2013.01); *G09F 19/14* (2013.01); *G02B 5/02* (2013.01); *G02B 5/0236* (2013.01); *G02B 5/0247* (2013.01)

(58) Field of Classification Search
CPC .... G02B 5/02; G02B 5/0236; G02B 5/0242; G02B 5/0247; G02B 6/0051; G02F 1/133504
USPC ........................................ 359/599, 601, 613
See application file for complete search history.

(56) References Cited

U.S. PATENT DOCUMENTS 6,297,908 B1   10/2001  Suga
6,398,370 B1    6/2002  Chiu et al.
(Continued)

FOREIGN PATENT DOCUMENTS

CN      1463368      12/2003
CN      1474950       2/2004
(Continued)

OTHER PUBLICATIONS

English machine translation of JP 2007272065 A.*

*Primary Examiner* — Thomas K Pham
*Assistant Examiner* — Nicholas R Pasko
(74) *Attorney, Agent, or Firm* — Norris McLaughlin & Marcus, P.A.

(57) ABSTRACT

The view angle-restricting sheet includes an optical function layer which includes: a plurality of first light transmission sections provided to protrude in a multi-stripe fashion; and a second light transmission section disposed around the plurality of first light transmission sections. Both sides of a top portion of the first light transmission section are formed to have a chamfer-like shape, and the first light transmission section exhibits an optical function distinct from an optical function of the second light transmission section. At least the top portion of the first light transmission section preferably has an inverted-U shaped vertical cross section. The first light transmission section preferably contains a resin matrix and a light diffusing agent contained in the matrix.

9 Claims, 8 Drawing Sheets

(51) Int. Cl.
*G09F 19/14* (2006.01)
*G02F 1/1335* (2006.01)

(56) References Cited

U.S. PATENT DOCUMENTS

| | | | |
|---|---|---|---|
| 6,937,399 B2 * | 8/2005 | Takahashi | G02B 5/0242 |
| | | | 359/599 |
| 7,611,262 B2 * | 11/2009 | Chang | G02B 5/0215 |
| | | | 362/246 |
| 2004/0047042 A1 | 3/2004 | Takahashi et al. | |
| 2005/0243428 A1 | 11/2005 | Takahashi et al. | |
| 2006/0103779 A1 * | 5/2006 | Amemiya | G02F 1/133524 |
| | | | 349/95 |
| 2006/0104084 A1 | 5/2006 | Amemiya et al. | |
| 2007/0015337 A1 | 1/2007 | Yano | |
| 2009/0279175 A1 * | 11/2009 | Laney | G02B 5/0226 |
| | | | 359/599 |
| 2010/0157216 A1 | 6/2010 | Wada | |
| 2010/0245738 A1 | 9/2010 | Nishihara et al. | |
| 2010/0271721 A1 * | 10/2010 | Gaides | G02B 5/045 |
| | | | 359/885 |
| 2011/0242463 A1 * | 10/2011 | Park | G02B 5/0263 |
| | | | 349/106 |
| 2015/0131154 A1 * | 5/2015 | Tsuji | G09F 19/14 |
| | | | 359/599 |

FOREIGN PATENT DOCUMENTS

| | | |
|---|---|---|
| CN | 1906505 | 1/2007 |
| GB | 2 418 518 | 3/2006 |
| JP | 2006-171701 | 6/2006 |
| JP | 2006-343711 | 12/2006 |
| JP | 2007272065 A * | 10/2007 |
| JP | 2009-031746 | 2/2009 |
| JP | 2009-109556 | 5/2009 |
| JP | 2010-015070 | 1/2010 |
| JP | 2010-223996 | 10/2010 |
| KR | 2003-0004401 | 1/2003 |

* cited by examiner (a)

(b)

— VIEW ANGLE-RESTRICTING SHEET AND FLAT PANEL DISPLAY

TECHNICAL FIELD

The present invention relates to a view angle-restricting sheet and a flat panel display.

BACKGROUND OF THE INVENTION

Flat panel displays are intensively used as information display devices such as mobile phones, personal digital assistances (PDAs), personal computers and televisions.

As far as the mobile phones and the personal digital assistances are concerned, for example, the flat panel displays provide advantages that: they enable necessary information to be obtained wherever the information is desired; and the like. However, in some places, an image displayed on the mobile phones or the personal digital assistances is highly likely to be subjected to peeking by person(s) around a user, which causes an issue of privacy such as leakage of personal information.

In addition, some flat panel displays include a touchscreen in order to improve ease of operation for users, speedy operability, and the like. Such flat panel displays that include the touchscreen are employed in ATMs (automated teller machines) installed in banks, for example; however, if a security code or personal information is subjected to peeking by person(s) around a user when the user inputs the security code or personal information through the touchscreen, such information may be used for improper purposes.

In view of such problems, in these days, a view angle-restricting sheet has been proposed that can prevent peeking by person(s) around a user by restricting a view angle (see Japanese Unexamined Patent Application, Publication No. 2010-223996).

The view angle-restricting sheet (which may be referred to as "view angle-controlling optical sheet") includes a first region that yields a narrow view angle on a display screen, and a second region that yields a wide view angle on the display screen. The view angle-controlling optical sheet is characterized in that the first region is formed by alternately arranging: light transmission sections that contain an optically transparent material; and light-absorbing sections that contain a light-absorbing material. The view angle-controlling optical sheet can extract rays of light having an incident angle falling within a certain range of angle, predominantly including those perpendicularly oriented, and absorb rays of light obliquely oriented on the light-absorbing section, and therefore the peeking by the person(s) around the user from the oblique direction can be prevented. However, in the view angle-controlling optical sheet, the light-absorbing sections are arranged at a constant interval, and therefore the view angle-controlling optical sheet has a disadvantage that a reduction in front face luminance is likely to be caused.

PRIOR ART DOCUMENTS

Patent Document 1: Japanese Unexamined Patent Application, Publication No. 2010-223996

SUMMARY OF THE INVENTION

The present invention was made in view of the foregoing circumstances, and an object of the present invention is to provide: a view angle-restricting sheet capable of suitably preventing leakage of personal information and the like through glimmering from an oblique direction and capable of inhibiting a reduction in front face luminance; and a flat panel display that includes the view angle-restricting sheet.

Means for Solving the Problems

According to an aspect of the invention made for solving the aforementioned problems, a view angle-restricting sheet is provided, including an optically functional layer which includes:

a plurality of first light transmission sections provided to protrude in a multi-stripe fashion; and a second light transmission section disposed around the plurality of first light transmission sections, wherein both sides of a top portion of the first light transmission section are formed to have a chamfer-like shape, and the first light transmission section exhibits an optical function distinct from an optical function of the second light transmission section.

According to the view angle-restricting sheet, since optical functions of the first light transmission section and the second light transmission section differ from each other, the transmission direction of the rays of light having entered either the first light transmission section or the second light transmission section can be altered. Therefore, according to the view angle-restricting sheet, a sharp image can be displayed to a person seeing from the front face side (user) using the rays of light having entered substantially perpendicularly to the optical function layer and passing through, for example, only the second light transmission section, whereas a blurred image can be displayed to a person seeing from a certain direction since the transmission direction of the rays of light having entered the first light transmission section is altered, whereby the leakage of personal information and the like can be prevented. Moreover, in the view angle-restricting sheet, since the second light transmission section is disposed around the plurality of first light transmission sections, and both sides of the top portion of the first light transmission section are formed to have a chamfer-like shape, a contact area between the first light transmission section and the second light transmission section can be increased, and thereby the first light transmission section and the second light transmission section can be firmly fixed. As a result, the view angle-restricting sheet can exhibit improved shape stability, and the like.

According to the view angle-restricting sheet, at least the top portion of the first light transmission section preferably has an inverted-U shaped vertical cross section. Thus, the contact area between the first light transmission section and the second light transmission section can be suitably increased.

According to the view angle-restricting sheet, the first light transmission section preferably contains a resin matrix and a light diffusing agent contained in the matrix. Thus, the rays of light having entered from the back face side in a certain oblique direction with respect to the second light transmission section are allowed to exit after being diffused by the first light transmission sections. On the other hand, the view angle-restricting sheet allows the rays of light having entered from the back face side substantially perpendicularly to the second light transmission section to exit substantially perpendicularly from the front face side of the second light transmission section. Therefore, the view angle-restricting sheet can serve to display a sharp image to the person seeing from the front direction, and can prevent the leakage of personal information and the like to a person seeing from the oblique direction by blurring the image displayed. The view angle-restricting sheet prevents the leakage of personal information and the like by diffusing, by means of the first light transmission sections, the rays of light having entered from the back face side in a certain oblique direction with respect to the second light transmission section; therefore, a reduction in front face luminance can be inhibited. Since both sides of the top portion of the first light transmission section are formed to have a chamfer-like shape, the view angle-restricting sheet enables the view angle to be easily and suitably adjusted through adjusting the shape of the upper portion.

According to the view angle-restricting sheet, a refractive index ($n_1$) of the matrix is preferably greater than a refractive index ($n_2$) of the second light transmission section. Thus, the rays of light having entered from an oblique direction can be oriented more outwardly, and the sharpness of an image displayed to the person seeing from the front direction can be improved.

According to the view angle-restricting sheet, a difference ($n_1-n_2$) between the refractive index ($n_1$) of the matrix and the refractive index ($n_2$) of the second light transmission section is preferably no less than 0.15. Thus, the sharpness of an image displayed to the person seeing from the front direction can be further improved.

According to the view angle-restricting sheet, it is preferred that the light diffusing agent is resin beads, and the refractive index ($n_1$) of the matrix is greater than a refractive index ($n_3$) of the resin beads. Thus, the rays of light having entered the first light transmission section can be suitably diffused.

According to the view angle-restricting sheet, the matrix is preferably formed from an ionizing radiation-curable resin. Thus, ease of formation of the first light transmission section can be improved, and the accuracy of the first light transmission section formed can be improved. In addition, in the view angle-restricting sheet, due to the matrix being formed from the ionizing radiation-curable resin, the physical strength of the first light transmission section can be enhanced.

According to the view angle-restricting sheet, the ratio ($T_1/W_1$) of the thickness ($T_1$) of the first light transmission section to the width ($W_1$) on the back face side of the first light transmission section is preferably no less than ½ and no greater than 4. Thus, the rays of light having entered the first light transmission section can be suitably diffused, and the view angle can be suitably adjusted through adjusting the shape of the top portion of the first light transmission section.

According to the view angle-restricting sheet, the ratio ($W_2/W_1$) of the width ($W_2$) on the back face side of the second light transmission section to the width ($W_1$) on the back face side of the first light transmission section is preferably no less than 1 and no greater than 4. Thus, the leakage of personal information and the like through glimmering from the oblique direction can be prevented, and a reduction in sharpness of an image can be inhibited using the rays of light diffused by the first light transmission section, when the image is seen from the front direction.

According to the view angle-restricting sheet, the width ($W_2$) on the back face side of the second light transmission section is preferably no less than 10 μm and no greater than 200 μm. Thus, the leakage of personal information and the like through glimmering from the oblique direction can be prevented, and a reduction in sharpness of an image can be inhibited when the image is seen from the front direction.

Further, according to the view angle-restricting sheet, the second light transmission section preferably contains a resin matrix and a light diffusing agent contained in the matrix. Also in such a configuration, the view angle-restricting sheet allows the rays of light having entered from the back face side in a certain oblique direction with respect to the first light transmission section to exit after being diffused by the second light transmission section. On the other hand, the view angle-restricting sheet allows the rays of light having entered from the back face side substantially perpendicularly to the first light transmission section to exit substantially perpendicularly from the front face side of the first light transmission section. Therefore, the view angle-restricting sheet can serve to display a sharp image to the person seeing from the front direction, and can prevent the leakage of personal information and the like to a person seeing from the oblique direction by blurring the image displayed. In addition, according to the view angle-restricting sheet, since both sides of the top portion of the first light transmission section are formed to have a chamfer-like shape, and the second light transmission section is disposed around the plurality of first light transmission sections, an anti-glare function is imparted by the upper portion of the second light transmission section. As a result, by diffusing rays of light from outside, the view angle-restricting sheet can prevent a reduction in visibility caused by the reflection of rays of light from outside and/or the reflected glare of an image.

According to the view angle-restricting sheet, it is preferred that the second light transmission section is integrally formed so as to cover top portions of the first light transmission sections. Thus, the moldability, the strength, the shape stability and the like can be improved.

According to the view angle-restricting sheet, it is preferred that the optical function layer further includes a substrate layer provided on the back face side thereof composed of the first light transmission section and the second light transmission section. Thus, the moldability, the strength, the shape stability and the like can be improved.

The view angle-restricting sheet is preferably provided on the front face side of a display panel of a flat panel display. Thus, a sharp image can be displayed to the person seeing from the front direction, and the leakage of personal information and the like through glimmering from the oblique direction can be suitably prevented.

Moreover, according to another aspect of the invention made for solving the aforementioned problems, a flat panel display is provided, including the view angle-restricting sheet according to the aspect of the present invention provided on a front face side of a display panel.

According to the flat panel display, since optical functions of the first light transmission section and the second light transmission section of the view angle-restricting sheet differ from each other, the transmission direction of the rays of light having entered either the first light transmission section or the second light transmission section can be altered. Therefore, the flat panel display can display a sharp image to a person seeing from the front face side, using the rays of light having entered substantially perpendicularly to the optical function layer of the view angle-restricting sheet and passing through, for example, only the second light transmission section, and alter the transmission direction of the rays of light having entered the first light transmission section to blur an image displayed to a person seeing from a certain direction, whereby the leakage of personal information and the like can be prevented.

It is to be noted that the terms "width" and "distance" as used herein mean an average width or distance. Moreover, the term "thickness" means an average thickness measured in accordance with JIS K7130. The term "front face side" means the observer side of a flat panel display, and the term "back face side" means the opposite side thereof. The term "chamfer" conceptually encompasses planes and curved surface shapes.

As explained in the foregoing, the view angle-restricting sheet and the flat panel display including the view angle-restricting sheet according to the aspects of the present invention enable the leakage of personal information and the like through glimmering from the oblique direction to be suitably prevented and a reduction in front face luminance to be inhibited.

DESCRIPTION OF THE PREFERRED EMBODIMENTS

First Embodiment

View Angle-Restricting Sheet 1

Hereinafter, preferred modes for carrying out the present invention will be explained in more detail with reference to the drawings, if necessary.

Figure 1:
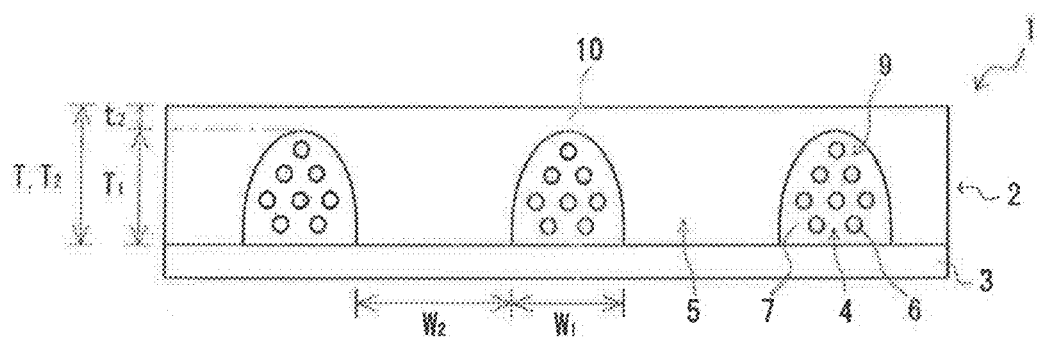
FIG. 1 is a schematic cross sectional view illustrating a view angle-restricting sheet according to an embodiment of the present invention.

A view angle-restricting sheet 1 shown in FIG. 1 includes an optical function layer 2 and a substrate layer 3.

Optical Function Layer 2

The optical function layer 2 includes a plurality of first light transmission sections 4 provided to protrude in a multi-stripe fashion, and a second light transmission section 5 disposed around the plurality of first light transmission sections 4. The first light transmission section 4 and the second light transmission section 5 are formed such that they each exhibit a distinct optical function. The front face and the back face of the optical function layer 2 are formed to be entirely flat. In the optical function layer 2, the first light transmission section 4 and the second light transmission section 5 are alternately arranged without any gap.

The thickness (T) of the optical function layer 2 is preferably, but not particularly limited to, no less than 10 μm and no greater than 70 μm. The upper limit value of the thickness (T) of the optical function layer 2 is more preferably 60 μm, and still more preferably 50 μm. On the other hand, the lower limit value of the thickness (T) of the optical function layer 2 is more preferably 15 μm, and still more preferably 20 μm. When the thickness (T) of the optical function layer 2 is greater than the upper limit value, the light transmittance may be deteriorated, and it may be difficult to satisfy a requirement of a reduction in thickness of the view angle-restricting sheet 1. To the contrary, the thickness (T) of the optical function layer 2 is less than the lower limit value, the amount of the light diffusing agent 6 contained in the first light transmission section 4 may be decreased, and sufficient light diffusing ability may not be exhibited.

First Light Transmission Section 4

The first light transmission section 4 contains a resin matrix 7 and a light diffusing agent 6 contained in the resin matrix 7. At least both sides of a top portion of the first light transmission section 4 are formed to have a chamfer-like shape.

Although the synthetic resin for forming the matrix 7 is not particularly limited, a thermoplastic resin may be suitably used. Examples of the thermoplastic resin include polyethylene terephthalate, polyethylene naphthalate, acrylic resins, polycarbonates, polystyrenes, polyolefins, cellulose acetate and weather resistant vinyl chlorides. Of these, as the synthetic resin for forming the matrix 7, polyethylene terephthalate and polycarbonates are preferred in light of superior transparency and strength, as well as ease of controlling birefringence thereof, and polyethylene terephthalate that exhibits an improved deflectional performance is particularly preferred.

In addition, an ionizing radiation-curable resin may also be suitably used as the synthetic resin for forming the matrix 7. Although the ionizing radiation-curable resin is not particularly limited, ultraviolet ray-curable resins that can be cured by an ultraviolet ray and electron beam-curable resins that can be cured by an electron beam may be used as the ionizing radiation-curable resin. Ultraviolet ray-curable resins are preferably used as such an ionizing radiation-curable resin in light of availability and ease of handling.

Examples of the ultraviolet ray-curable resin include ultraviolet ray-curable urethane acrylate resins, ultraviolet ray-curable polyester acrylate resins, ultraviolet ray-curable epoxy acrylate resins, ultraviolet ray-curable polyol acrylate resins and ultraviolet ray-curable epoxy resins, and among these, ultraviolet ray-curable acrylate resins are preferred.

According to the view angle-restricting sheet 1, when the ionizing radiation-curable resin is used as the resin for forming the matrix 7, the ease of formation of the first light transmission section 4 can be improved, and the accuracy of the first light transmission section 4 formed can be improved. In addition, in the view angle-restricting sheet 1, when the matrix 7 is formed from the ionizing radiation-curable resin, the physical strength of the first light transmission section 4 can be increased.

When the ultraviolet ray-curable resin is used as the synthetic resin for forming the matrix 7, a photoinitiator is preferably used in combination. Examples of the photoinitiator include benzoin and derivatives thereof, as well as acetophenone, benzophenone, hydroxybenzophenone, Michler's ketone, α-amyloxime ester, thiaxanthon, etc. and derivatives thereof.

Although the content of the photoinitiator is not particularly limited, the content of the photoinitiator with respect to the ultraviolet ray-curable resin is preferably no less than 1% by mass and no greater than 10% by mass, and more preferably no less than 3% by mass and no greater than 6% by mass. When the content of the photoinitiator is greater than the upper limit, a degree of polymerization of the ultraviolet ray-curable resin may be decreased. To the contrary, when the content of the photoinitiator is less than the lower limit, the curing reaction may not proceed sufficiently.

In addition, an additive such as a curing agent, a plasticizer, a dispersant, various types of levelling agents, an ultraviolet ray-absorbing agent, an antioxidant, a viscosity modifier, a lubricant and a light stabilizer may be appropriately blended into the matrix 7, as needed.

Moreover, the matrix 7 preferably contains a pigment in a dispersion state. The pigment contained in the matrix 7 in a dispersion state is not particularly limited, and exemplified by white pigments, black pigments, blue pigments, red pigments, and the like. Although the pigment contained in the matrix 7 in a dispersion state may be either an inorganic pigment or an organic pigment, an inorganic pigment is suitably used in light of its superior light resistance and the like.

The white pigment is not particularly limited, and examples thereof include calcium carbonate, titanium oxide, zinc oxide, lead carbonate, barium sulfate, silicon oxide, aluminum oxide, and the like.

The black pigment is not particularly limited, and examples thereof include carbon black, black iron oxide, and the like.

The blue pigment is not particularly limited, and examples thereof include cobalt blue, ultramarine, Prussian blue, turquoise blue, manganese blue, phthalocyanine blue, and the like.

The red pigment is not particularly limited, and examples thereof include colcothar (red iron oxide), cadmium red, molybdenum orange, and the like.

The mean particle size of the pigment is preferably, but not particularly limited to, no less than 100 nm and no greater than 30 μm. The upper limit value of the mean particle size of the pigment is more preferably 3 μm, and still more preferably 1 μm. On the other hand, the lower limit value of the mean particle size of the pigment is more preferably 200 nm, and still more preferably 300 nm. When the mean particle size of the pigment is greater than the upper limit value, the width of the first light transmission section 4 may be excessively increased. To the contrary, when the mean particle size of the pigment is less than the lower limit value, the dispersibility of the pigment may be deteriorated. It is to be noted that the mean particle size used herein means an average of particle sizes of 30 particles randomly sampled from particles observed using an electron microscope at a magnification of ×1,000. In addition, the particle size is defined in terms of Feret's diameter (a distance between parallel lines along a specified direction when a projection is restricted between the parallel lines).

The content of the pigment with respect to the matrix 7 is preferably, but not particularly limited to, no less than 5 parts by mass and no greater than 30 parts by mass. The upper limit value of the content of the pigment is more preferably 25 parts by mass, and still more preferably 20 parts by mass. On the other hand, the lower limit value of the content of the pigment is more preferably 7 parts by mass, and still more preferably 10 parts by mass. When the content of the pigment is greater than the upper limit value, the light diffusion effect exhibited by the first light transmission sections 4 is highly likely to be impaired. To the contrary, when the content of the pigment is less than the lower limit value, various characteristics and effects exhibited by the pigment may be deteriorated.

In the view angle-restricting sheet 1, when the matrix 7 contains the pigment in a dispersion state, heat resistance, thermal dimensional stability, weather resistance, strength, an ability to prevent degradation over time, and the like of the first light transmission sections 4 can be improved. In addition, when the matrix 7 contains the white pigment in a dispersion state, the view angle-restricting sheet 1 allows the rays of light directed toward the first light transmission section 4 from the second light transmission section 5 to be reflected by the second light transmission section 5. As a result, the luminance in the front direction of the view angle-restricting sheet 1 can be improved. In addition, according to the view angle-restricting sheet 1, when the matrix 7 contains the black pigment in a dispersion state, the light absorptivity of the first light transmission section 4 can be enhanced. As a result, the view angle-restricting sheet 1 allows the rays of light having entered the first light transmission section 4 to be absorbed to some extent, and consequently the visibility from the oblique direction to be reduced.

The thickness ($T_1$) of the first light transmission section 4 is preferably, but not particularly limited to, no less than 9 μm and no greater than 60 μm. The upper limit of the thickness ($T_1$) of the first light transmission section 4 is more preferably 50 μm, and still more preferably 40 μm. On the other hand, the lower limit of the thickness ($T_1$) of the first light transmission section 4 is more preferably 14 μm, and still more preferably 19 μm. When the thickness ($T_1$) of the first light transmission section 4 is greater than the upper limit, the thickness (T) of the optical function layer 2 may be increased and consequently the light transmittance of the optical function layer 2 may be deteriorated, and it is highly likely to be difficult to satisfy a requirement of a reduction in thickness of the view angle-restricting sheet 1. To the contrary, when the thickness ($T_1$) of the first light transmission section 4 is less than the lower limit, suitably diffusing the rays of light by the first light transmission section 4 is highly likely to fail.

The width ($W_1$) on the back face side of the first light transmission section 4 is preferably, but not particularly limited to, no less than 2.5 μm and no greater than 60 μm. The upper limit value of the width ($W_1$) on the back face side of the first light transmission section 4 is more preferably 50 μm, and still more preferably 40 μm. On the other hand, the lower limit value of the width ($W_1$) on the back face side of the first light transmission section 4 is more preferably 5 μm, and still more preferably 7 μm. When the width ($W_1$) on the back face side of the first light transmission section 4 is greater than the upper limit value, the quantity of the rays of light diffused by the first light transmission sections 4 may be increased and consequently the visibility of an image from the front direction is highly likely to be impaired. To the contrary, when the width ($W_1$) on the back face side of the first light transmission section 4 is less than the lower limit value, suitably diffusing the rays of light by the first light transmission sections 4 is highly likely to fail.

The ratio ($T_1/W_1$) of the thickness ($T_1$) of the first light transmission section 4 to the width ($W_1$) on the back face side of the first light transmission section 4 is preferably, but not particularly limited to, no less than ½ and no greater than 4. The upper limit of the ratio ($T_1/W_1$) of the thickness ($T_1$) of the first light transmission section 4 to the width ($W_1$) on the back face side of the first light transmission section 4 is more preferably 3, and still more preferably 2. On the other hand, the lower limit of the ratio ($T_1/W_1$) of the thickness ($T_1$) of the first light transmission section 4 to the width ($W_1$) on the back face side of the first light transmission section 4 is more preferably ⅔, and still more preferably 1. When the ratio ($T_1/W_1$) of the thickness ($T_1$) of the first light transmission section 4 to the width ($W_1$) on the back face side of the first light transmission section 4 does not fall within the above range, displaying a sharp image to the person seeing from the front direction is highly likely to fail, and moreover the first light transmission section 4 is highly likely to be difficult to be formed using certain printing techniques.

The refractive index ($n_1$) of the matrix 7 is preferably, but not particularly limited to, no less than 1.57, more preferably no less than 1.6, and still more preferably no less than 1.63. When the refractive index ($n_1$) of the matrix 7 falls within the above range, the rays of light having entered the first light transmission section 4 from the second light transmission section 5 can be suitably prevented from exiting as rays of light having a peak along a direction comparatively close to the front direction, and in turn, the sharpness of an image displayed to the person seeing from the front direction can be improved.

It is to be noted that fine particles of, for example, ZnO, $TiO_2$, $CeO_2$, $SnO_2$, ITO, $Cs_{0.33}WO_3$, $Al_2O_3$, $La_2O_3$, $ZrO_2$, $Y_2O_3$ or the like having a high refractive index may be added to the matrix 7 for the purpose of increasing the refractive index. The mean particle size of the fine particles having a high refractive index is preferably, but not particularly limited to, no less than 1 nm and no greater than 100 nm. The upper limit value of the mean particle size of the fine particles having a high refractive index is more preferably 80 nm, and still more preferably 60 nm. On the other hand, the lower limit value of the mean particle size of the fine particles having a high refractive index is more preferably 5 nm, and still more preferably 10 nm. When the mean particle size of the fine particles having a high refractive index is greater than the upper limit value, the transparency of the first light transmission section 4 may be deteriorated. To the contrary, when the mean particle size of the fine particles having a high refractive index is less than the lower limit value, the dispersibility of the fine particles having a high refractive index may be deteriorated.

Although the content of the fine particles having a high refractive index with respect to the matrix 7 is not particularly limited, the content of the fine particles having a high refractive index may be, for example, no less than 10% by mass and no greater than 60% by mass.

The light diffusing agent 6 is contained in the first light transmission section 4 substantially with a uniform density. The light diffusing agent 6 is particles that have a property of diffusing rays of light, and is roughly divided into inorganic fillers and organic fillers. As an inorganic filler, silica, aluminum hydroxide, aluminum oxide, zinc oxide, barium sulfide, magnesium silicate, or a mixture thereof may be used, for example. As a material for an organic filler, an acrylic resin, an acrylonitrile resin, a polyolefin resin, polyurethane, polyvinyl chloride, polystyrene, polyacrylonitrile, polyamide and the like may be used, for example. Among these, an acrylic resin is preferred in light of superior transparency, and polymethyl methacrylate (PMMA) is particularly preferred.

The shape of the light diffusing agent 6 is not particularly limited, and examples thereof include a spherical shape, a spindle shape, a needle-like shape, a rod-like shape, a cubic shape, a platy shape, a flaky shape, a fiber-like shape, and the like; among these, spherical beads that are superior in light-diffusing ability are preferred.

The mean particle size of the light diffusing agent 6 is preferably, but not particularly limited to, no less than 1 μm and no greater than 25 μm. The upper limit value of the mean particle size of the light diffusing agent 6 is more preferably 20 μm, and still more preferably 15 μm. On the other hand, the lower limit value of the mean particle size of the light diffusing agent 6 is more preferably 1.5 μm, and still more preferably 2 μm. When the mean particle size of the light diffusing agent 6 is greater than the upper limit value, the width of the first light transmission section 4 may be increased. To the contrary, when the mean particle size of the light diffusing agent 6 is less than the lower limit value, the dispersibility of the light diffusing agent 6 may be deteriorated.

The mass ratio of the light diffusing agent 6 to the matrix 7 is preferably, but not particularly limited to, no less than 0.1 and no greater than 2. The upper limit of the mass ratio of the light diffusing agent 6 to the matrix 7 is more preferably 1, and still more preferably 0.5. On the other hand, the lower limit of the mass ratio of the light diffusing agent 6 to the matrix 7 is more preferably 0.2, and still more preferably 0.3. When the mass ratio of the light diffusing agent 6 to the matrix 7 is greater than the upper limit, the effect of fixing the light diffusing agent 6 may be deteriorated. To the contrary, when the mass ratio of the light diffusing agent 6 to the matrix 7 is less than the lower limit, the light-diffusing ability may be insufficient.

The absolute value of the difference ($|n_1-n_3|$) between the refractive index ($n_1$) of the matrix 7 and the refractive index ($n_3$) of the light diffusing agent 6 is preferably, but not particularly limited to, no less than 0.03, more preferably no less than 0.06, and still more preferably no less than 0.09. When the absolute value of the difference ($|n_1-n_3|$) between the refractive index ($n_1$) of the matrix 7 and the refractive index ($n_3$) of the light diffusing agent 6 is less than the lower limit, the rays of light having entered the first light transmission section 4 may not be able to be suitably diffused at a boundary between the matrix 7 and the light diffusing agent 6.

In addition, the refractive index ($n_1$) of the matrix 7 is preferably greater than the refractive index ($n_3$) of the light diffusing agent 6. According to the view angle-restricting sheet 1, when the refractive index ($n_1$) of the matrix 7 is greater than the refractive index ($n_3$) of the light diffusing agent 6, rays of light can be suitably diffused at a boundary between the matrix 7 and the light diffusing agent 6.

The cross-sectional shape of the top portion 9 of the first light transmission section 4 is not particularly limited, but the top portion 9 of the first light transmission section 4 is preferably formed to have an inverted-U shaped vertical cross-section. According to the view angle-restricting sheet 1, when the top portion 9 has an inverted-U shaped vertical cross section, the contact area between the first light transmission section 4 and the second light transmission section 5 can be suitably increased. In addition, according to such a configuration of the view angle-restricting sheet 1, the view angle can be suitably adjusted through adjusting an angle of inclination of the lateral face of the top portion 9.

Second Light Transmission Section 5

The second light transmission section 5 includes a superficial layer portion 10 formed so as to cover the top portions 9 of the first light transmission sections 4. The second light transmission section 5 is integrally formed through the superficial layer portion 10.

The second light transmission section 5 contains a transparent, in particular, colorless and transparent, synthetic resin as a principal component, since the second light transmission section 5 needs to transmit rays of light. Although the synthetic resin as a principal component of the second light transmission section 5 is not particularly limited, examples thereof include synthetic resins similar to the synthetic resins for forming the matrix 7 of the first light transmission section 4. Moreover, additives similar to those for the first light transmission section 4 may be added to the second light transmission section 5.

Although the thickness ($T_2$) of the second light transmission section 5 is not particularly limited, the thickness ($T_2$) of the second light transmission section 5 may be the same as the thickness (T) of the optically functional layer 2, in general.

The width ($W_2$) on the back face side of the second light transmission section 5 is preferably, but not particularly limited to, no less than 10 μm and no greater than 200 μm. The upper limit value of the width (W2) on the back face side of the second light transmission section 5 is more preferably 150 μm, and still more preferably 100 μm. On the other hand, the lower limit value of the width (W2) on the back face side of the second light transmission section 5 is more preferably 15 μm, and still more preferably 20 μm. When the width ($W_2$) on the back face side of the second light transmission section 5 is greater than the upper limit value, suitably preventing the leakage of personal information through glimmering from the oblique direction is highly likely to fail. To the contrary, when the width ($W_2$) on the back face side of the second light transmission section 5 is less than the lower limit, displaying a sharp image to the person seeing from the front direction is highly likely to fail.

The ratio ($T_2/W_2$) of the thickness ($T_2$) of the second light transmission section 5 to the width ($W_2$) on the back face side of the second light transmission section 5 is preferably, but not particularly limited to, no less than ⅓ and no greater than 4. The upper limit of the ratio ($T_2/W_2$) of the thickness ($T_2$) of the second light transmission section 5 to the width ($W_2$) on the back face side of the second light transmission section 5 is more preferably 3, and still more preferably 2. On the other hand, the lower limit of the ratio ($T_2/W_2$) of the thickness ($T_2$) of the second light transmission section 5 to the width ($W_2$) on the back face side of the second light transmission section 5 is more preferably ⅔, and still more preferably 1. When the thickness ratio ($T_2/W_2$) is greater than the upper limit, the quantity of the rays of light exiting from the front face side of the second light transmission section 5 may be reduced, and suitably adjusting the view angle is highly likely to fail. In addition, when the thickness ratio ($T_2/W_2$) is less than the lower limit, the view angle may be excessively increased, and the leakage of personal information and the like to a person seeing from the oblique direction is highly likely to be caused.

The ratio ($W_2/W_1$) of the width ($W_2$) on the back face side of the second light transmission section 5 to the width ($W_1$) on the back face side of the first light transmission section 4 is preferably, but not particularly limited to, no less than 1 and no greater than 4. The upper limit of the ratio ($W_2/W_1$) of the width ($W_2$) on the back face side of the second light transmission section 5 to the width ($W_1$) on the back face side of the first light transmission section 4 is more preferably 3, and still more preferably 2. On the other hand, the lower limit of the ratio ($W_2/W_1$) of the width ($W_2$) on the back face side of the second light transmission section 5 to the width ($W_1$) on the back face side of the first light transmission section 4 is more preferably 1.5, and still more preferably 2. When the ratio ($W_2/W_1$) of the width ($W_2$) on the back face side of the second light transmission section 5 to the width ($W_1$) on the back face side of the first light transmission section 4 is greater than the upper limit, the view angle is highly likely to be excessively increased. To the contrary, when the ratio ($W_2/W_1$) of the width ($W_2$) on the back face side of the second light transmission section 5 to the width ($W_1$) on the back face side of the first light transmission section 4 is less than the lower limit, the sharpness of an image is highly likely to be impaired by the rays of light diffused by the first light transmission sections 4 when the image is seen from the front direction.

It is preferred that the refractive index ($n_2$) of the second light transmission section 5 differs from the refractive index ($n_1$) of the matrix 7. In addition, the refractive index ($n_2$) of the second light transmission section 5 is preferably less than the refractive index ($n_1$) of the matrix 7. In the view angle-restricting sheet 1, when the refractive index ($n_2$) of the second light transmission section 5 is less than the refractive index ($n_1$) of the matrix 7, the rays of light having entered the first light transmission section 4 from the second light transmission section 5 can be directed toward a direction perpendicular to the front direction. Therefore, the view angle-restricting sheet 1 can prevent the rays of light having a peak along a direction comparatively close to the front direction from exiting from the front face side of the first light transmission section 4, and in turn, the sharpness of an image displayed to the person seeing from the front direction can be improved.

Moreover, in a case where the refractive index ($n_2$) of the second light transmission section 5 is less than the refractive index ($n_1$) of the matrix 7, the difference ($n_1-n_2$) between the refractive index ($n_1$) of the matrix 7 and the refractive index ($n_2$) of the second light transmission section 5 is preferably, but not particularly limited to, no less than 0.15, more preferably no less than 0.3, and still more preferably no less than 0.45. When the difference ($n_1-n_2$) between the refractive index ($n_1$) of the matrix 7 and the refractive index ($n_2$) of the second light transmission section 5 is less than the lower limit, the sharpness of an image displayed to the person seeing from the front direction is highly likely to be difficult to be suitably improved.

The thickness ($t_2$) of the superficial layer portion 10 is preferably, but not particularly limited to, no less than 1 μm and no greater than 10 μm. The upper limit of the thickness ($t_2$) of the superficial layer portion 10 is more preferably 8 μm, and still more preferably 6 μm. On the other hand, the lower limit of the thickness ($t_2$) of the superficial layer portion 10 is more preferably 2 μm, and still more preferably 3 μm. When the thickness ($t_2$) of the superficial layer portion 10 is greater than the upper limit, it is highly likely to be difficult to satisfy a requirement of a reduction in thickness of the view angle-restricting sheet 1. To the contrary, when the thickness ($t_2$) of the superficial layer portion 10 is less than the lower limit, suitably enhancing the strength of the view angle-restricting sheet 1 is highly likely to fail.

Substrate Layer 3

The substrate layer 3 is provided on the back face thereof composed of the first light transmission section 4 and the second light transmission section 5. The thickness of the substrate layer 3 is preferably, but not particularly limited to, no less than 1 μm and no greater than 10 μm. The upper limit value of the thickness of the substrate layer 3 is more preferably 8 μm, and still more preferably 6 μm. On the other hand, the lower limit value of the thickness of the substrate layer 3 is more preferably 2 μm, and still more preferably 3 μm. When the thickness of the substrate layer 3 is greater than the upper limit value, it is highly likely to be difficult to satisfy a requirement of a reduction in thickness of the view angle-restricting sheet 1. To the contrary, when the thickness of the substrate layer 3 is less than the lower limit value, suitably increasing the strength of the view angle-restricting sheet 1 is highly likely to fail.

Mechanism of Diffusion of Rays of Light

Figure 2:
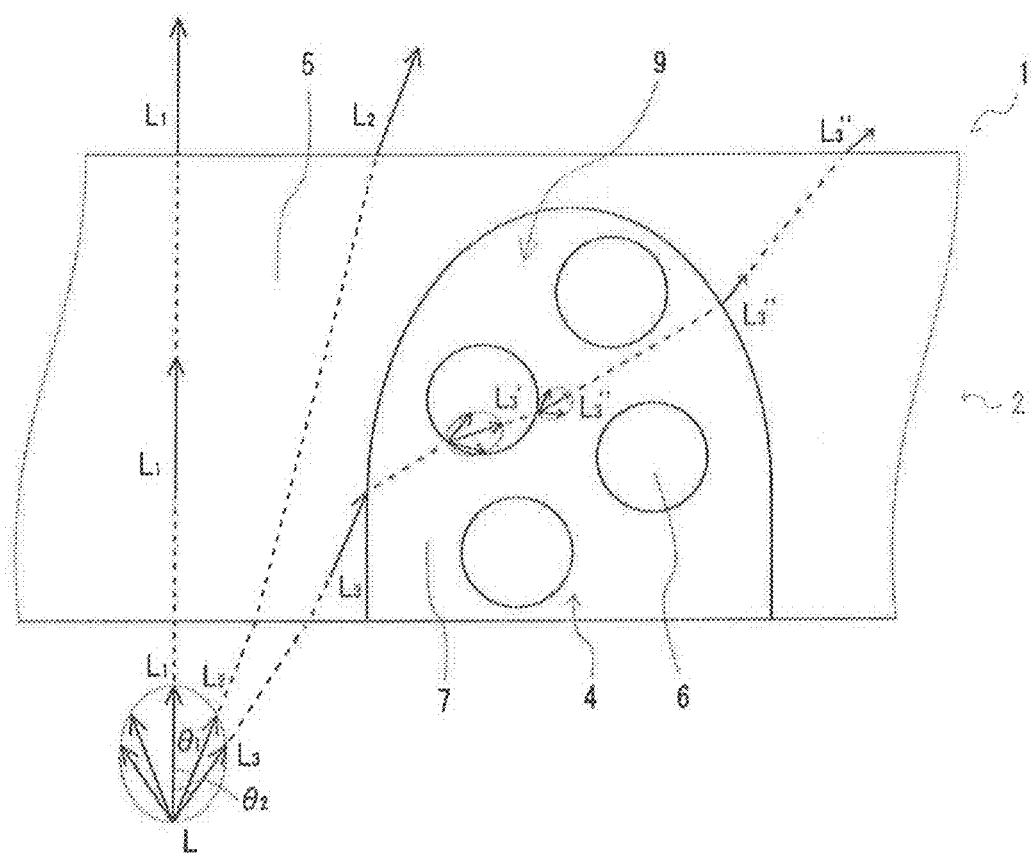
FIG. 2 is a diagram illustrating a mechanism of the diffusion of rays of light having entered the view angle-restricting sheet shown in FIG. 1 from the back face side.

Next, referring to FIG. 2, a mechanism of the diffusion of the rays of light having entered from the back face side of the view angle-restricting sheet 1 will be explained. It is to be noted that, in FIG. 2, the rays of light L enter from the back face side of the second light transmission section 5 and exhibit a distribution with a peak in the front direction.

First, among the rays of light L, the rays of light $L_1$ entering substantially perpendicularly from the back face side of the second light transmission section 5 pass through the second light transmission section 5, and exit substantially perpendicularly from the front face side of the second light transmission section 5.

On the other hand, among the rays of light L, the rays of light $L_2$ entering from the back face side of the second light transmission section 5 at an angle $\theta_1$ with respect to the rays of light $L_1$ enter the second light transmission section 5, and thereafter pass through the front face side of the top portion 9 of the first light transmission section 4 and exit from the front face side of the second light transmission section 5.

In contrast, among the rays of light L, the rays of light $L_3$ entering from the back face side of the second light transmission section 5 at an angle $\theta_2$ with respect to the rays of light $L_1$ are refracted at a boundary between the second light transmission section 5 and the first light transmission section 4 toward a direction perpendicular to the front direction, when entering the first light transmission section 4 from the second light transmission section 5. Further, the rays of light $L_3$ are diffused at a boundary between the matrix 7 and the light diffusing agent 6 in the first light transmission section 4. Then, the rays of light $L_3''$ which are diffused light of the rays of light $L_3$ are refracted toward the front direction at the boundary between the first light transmission section 4 and the second light transmission section 5, and then exit from the front face side of the second light transmission section 5 at a certain angle with respect to the front direction, with the intensity of the rays of light $L_3''$ being reduced as compared with the intensities of the rays of light $L_3$ and the rays of light $L_3'$.

Thus, according to the view angle-restricting sheet 1, a sharp image can be displayed with a desired view angle being maintained, using the rays of light not entering the first light transmission section 4 among the rays of light having entered the second light transmission section 5. In addition, according to the view angle-restricting sheet 1, the leakage of the information through glimmering from the oblique direction can be prevented by allowing the rays of light having entered the first light transmission section 4 from the second light transmission section 5 to exit after being suitably diffused.

Production Method

Figure 3:
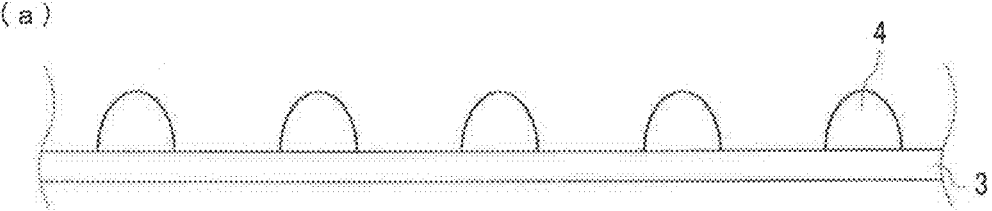
FIG. 3 is a schematic cross sectional view illustrating a process for producing the view angle-restricting sheet shown in FIG. 1.
Figure 3:
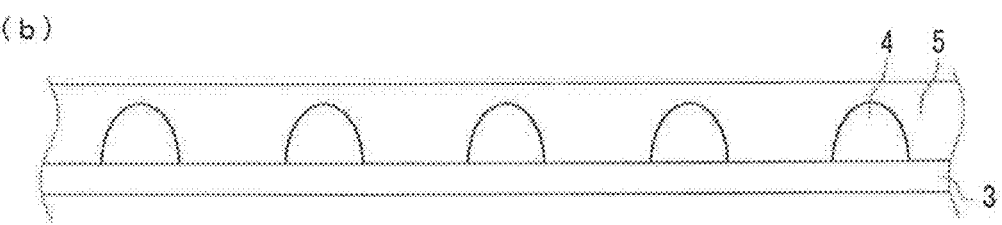

Referring to FIG. 3, the method for producing the view angle-restricting sheet 1 will be explained. A method for producing the view angle-restricting sheet 1 is not particularly limited as long as a view angle-restricting sheet having the aforementioned structure can be produced, and various methods may be employed. An exemplary method for producing the view angle-restricting sheet 1 includes steps of:

(1) providing a plurality of first light transmission sections 4 provided to protrude on the substrate layer 3 in a multi-stripe fashion, as shown in FIG. 3(*a*); (2) applying, around the plurality of first light transmission sections 4, a material for forming the second light transmission section 5 that exhibits an optical function distinct from an optical function of the first light transmission section, as shown in FIG. 3(*b*); and (3) hardening the material for forming the second light transmission section 5 and thereby providing the second light transmission section 5.

Moreover, the step (1) includes steps of: (a) coating a material for forming a plurality of first light transmission sections 4 provided to protrude on the front face of the substrate layer 3 in a multi-stripe fashion; and (b) irradiating the material for forming the first light transmission sections 4 with an ultraviolet ray or the like to allow curing thereof, and thereby providing the first light transmission sections 4. In addition, a procedure for coating a material for forming a plurality of first light transmission sections 4 on the front face of the substrate layer 3 in the step (a) is exemplified by well-known printing techniques such as gravure printing, flexography, silk-screen printing and offset lithography. In the view angle-restricting sheet 1, the top portions 9 of the first light transmission sections 4 can be easily provided by coating the material for forming the first light transmission sections 4 through such a technique.

When the view angle-restricting sheet 1 is produced through such a method, the first light transmission sections 4 can be easily provided through a general printing technique.

Furthermore, an exemplary method for producing the view angle-restricting sheet 1 other than that described above includes steps of: (1) providing the second light transmission section 5 that includes the superficial layer portion 10 in a sheet form and a plurality of protrusions that form grooves from the superficial layer portion 10 toward the back face side; (2) applying, around the protrusions provided on the second light transmission section 5, a material for forming the first light transmission sections 4 that exhibits an optical function distinct from that of the second light transmission section 5; (3) hardening the material for forming the first light transmission sections 4 and thereby providing the first light transmission sections 4; and (4) coating the substrate layer 3 on the back faces composed of the first light transmission sections 4 and the second light transmission section 5.

Specific examples of the step (1) include:

(a) a forming process that involves overlaying a synthetic resin on a sheet mold having a reversal shape of the back face of the second light transmission section 5, and peeling the sheet mold;

(b) an injection molding process that involves injecting a molten resin into a die having a reversal shape of the back face of the second light transmission section 5;

(c) a process that involves reheating a resin formed into a sheet, and pressing the resin between a die similar to the die mentioned in (b) above and a metal plate, thereby transferring the shape;

(d) an extrusion sheet molding process that involves passing a resin in a molten state through a nip between a roll mold having a reversal shape of the back face of the second light transmission section 5 therearound and other roll, thereby transferring the shape;

(e) a process that involves coating an ultraviolet ray-curable resin on the superficial layer portion 10 in a sheet form, pressing the ultraviolet ray-curable resin onto a sheet mold, a die or a roll mold each having a reversal shape similar to that mentioned above to transfer the shape to the uncured ultraviolet ray-curable resin, and then irradiating the uncured ultraviolet ray-curable resin with an ultraviolet ray to cure the ultraviolet ray-curable resin;

(f) a process that involves coating an uncured ultraviolet ray-curable resin on a die or roll mold each having a reversal shape similar to that mentioned in (e) above to fill the die or roll mold therewith, followed by pressing and levelling with the superficial layer portion 10 in a sheet form, and then irradiating the ultraviolet ray-curable resin with an ultraviolet ray to cure the ultraviolet ray-curable resin; and the like.

Specific examples of the step (2) include a process that involves filling depressed parts formed on the back face of the second light transmission section 5 with a liquid resin composition containing the light diffusing agent 6.

Specific examples of the step (3) include a process that involves: drying the resin composition applied in the depressed parts formed on the back face of the second light transmission section 5; and thereafter irradiating the resin composition with an ultraviolet ray or the like to allow curing thereof, thereby providing the first light transmission sections 4 having a predetermined thickness. Moreover, although a method for applying the resin composition containing the light diffusing agent 6 is not particularly limited, examples thereof include a spin coating method, a blade coating method, a die coating method, and the like.

The view angle-restricting sheet 1 can also be easily produced according to such a production method.

In the view angle-restricting sheet 1, since optical functions of the first light transmission section 4 and the second light transmission section 5 differ from each other, the transmission direction of the rays of light having entered either the first light transmission section 4 or the second light transmission section 5 can be altered. Therefore, the view angle-restricting sheet 1 can serve to display a sharp image to a person seeing from the front face side (user), using the rays of light having entered substantially perpendicularly to the optical function layer 2 and passing through only the second light transmission section 5, and alter the transmission direction of the rays of light having entered the first light transmission section 4 to blur the image displayed to a person seeing from a certain direction, whereby the leakage of personal information and the like can be prevented. Moreover, in the view angle-restricting sheet 1, since the second light transmission section 5 is disposed around the plurality of first light transmission sections 4, and both sides of the top portion of the first light transmission section 4 are formed to have a chamfer-like shape, a contact area between the first light transmission section 4 and the second light transmission section 5 can be increased, and thereby the first light transmission section 4 and the second light transmission section 5 can be firmly fixed. As a result, the view angle-restricting sheet 1 can exhibit improved shape stability, and the like.

In the view angle-restricting sheet 1, since the first light transmission sections 4 contains the resin matrix 7 and the light diffusing agent 6 contained in the resin matrix 7, the rays of light having entered the second light transmission section 5 from the back face side in a certain oblique direction are allowed to exit after being diffused by the first light transmission sections 4. On the other hand, the view angle-restricting sheet 1 allows the rays of light having entered from the back face side substantially perpendicularly to the second light transmission section 5 to exit from the front face side of the second light transmission section 5 substantially perpendicularly. Therefore, the view angle-restricting sheet 1 can display a sharp image to a person seeing from the front direction, and can prevent the leakage of personal information and the like to a person seeing from the oblique direction by blurring the image displayed. The view angle-restricting sheet 1 prevents the leakage of personal information and the like by diffusing, by means of the first light transmission sections 4, the rays of light having entered the second light transmission section 5 from the back face side in a certain oblique direction; therefore, a reduction in front face luminance can be inhibited. In the view angle-restricting sheet 1, since both sides of the top portion of the first light transmission section 4 are formed to have a chamfer-like shape, the view angle can be easily and suitably adjusted through adjusting the shape of the upper portion.

In the view angle-restricting sheet 1, since the optical function layer 2 includes the substrate layer 3 provided on the back face side thereof composed of the first light transmission section 4 and the second light transmission section 5, the moldability, the strength, the shape stability and the like can be improved.

In the view angle-restricting sheet 1, since the second light transmission section 5 is integrally formed so as to cover the top portions 9 of the first light transmission sections 4, the moldability, the strength, the shape stability and the like can be improved.

According to the view angle-restricting sheet 1, since the front face of the optically functional layer 2 is entirely flat, outgoing rays of light can be easily controlled. In addition, according to the view angle-restricting sheet 1, a constant thickness of the optically functional layer 2 can be maintained, and ease of use and optical uniformity thereof can be improved.

According to the view angle-restricting sheet 1, since the back face of the optically functional layer 2 is entirely flat, incident rays of light can be easily controlled. In addition, according to the view angle-restricting sheet 1, a constant thickness of the optically functional layer 2 can be maintained, and ease of use and optical uniformity can be improved.

Second Embodiment

View Angle-Restricting Sheet 11

Figure 4:
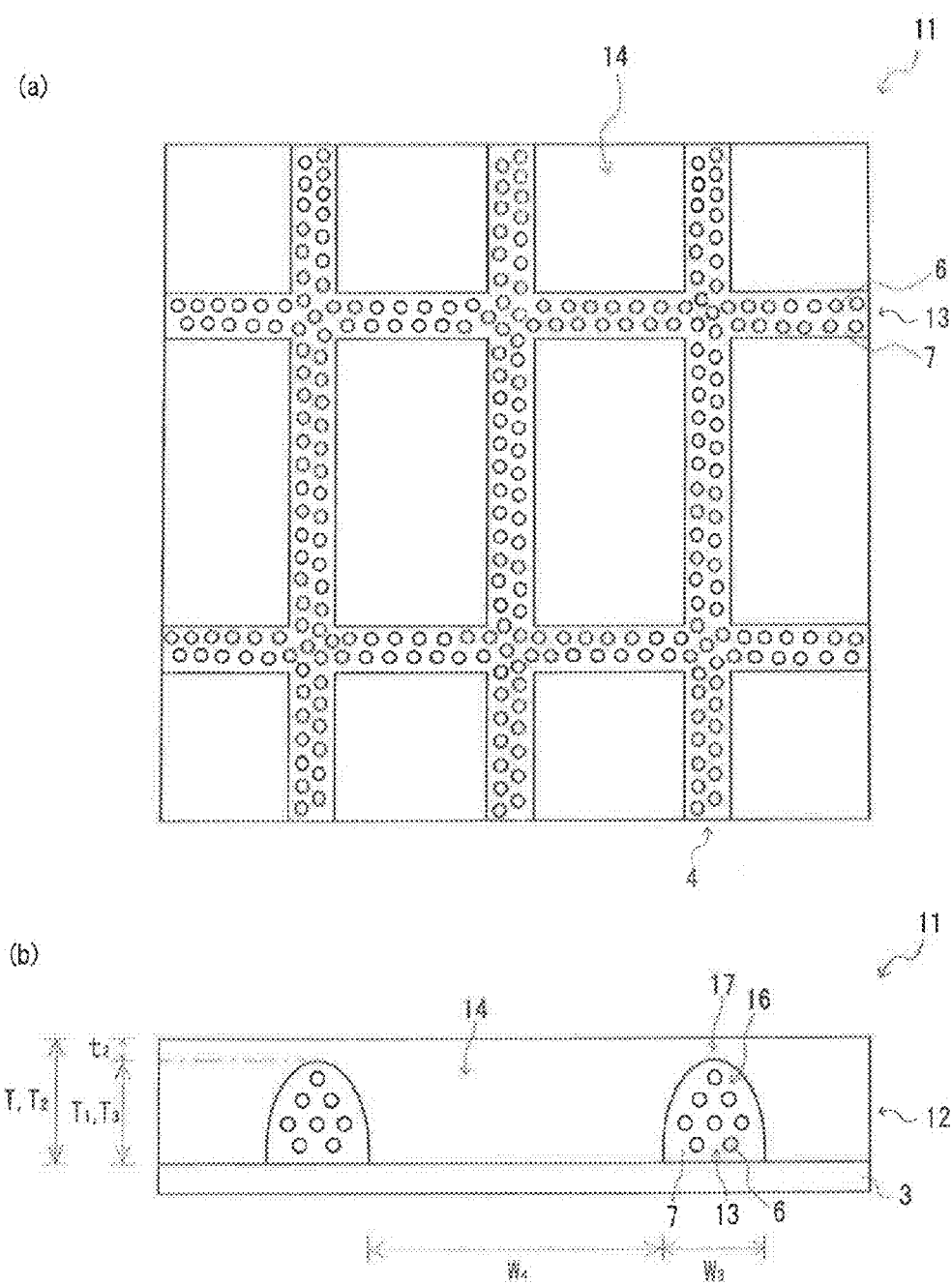
FIG. 4 is (a) a schematic plane cross sectional view and (b) a schematic lateral cross sectional view each illustrating a view angle-restricting sheet according to an embodiment distinct from the view angle-restricting sheet shown in FIG. 1.

The view angle-restricting sheet 11 shown in FIG. 4 includes an optically functional layer 12 and a substrate layer 3. Since the substrate layer 3 in this embodiment is similar to the substrate layer 3 shown in FIG. 1, explanation thereof will be omitted through designating the identical number.

Optical Function Layer 12

The optically functional layer 12 includes: a plurality of first light transmission sections 4 that are provided to protrude in a multi-stripe fashion; a second light transmission section 14 disposed around the plurality of first light transmission sections 4; and third light transmission sections 13 provided crosswise with respect to the first light transmission section 4. Since the first light transmission section 4 in this embodiment is similar to the first light transmission section 4 shown in FIG. 1, explanation thereof will be omitted through designating the identical number. The third light transmission sections 13 are provided such that they cross the first light transmission section 4 substantially at a right angle. The third light transmission sections 13 are provided substantially parallel to each other substantially at regular intervals. The front face and the back face of the optically functional layer 12 are formed to be entirely flat. In the optically functional layer 12, the first light transmission section 4, the second light transmission section 14 and the third light transmission section 13 are arranged without any gap. The thickness (T) of the optically functional layer 12 is similar to the thickness of the optically functional layer 2.

Third Light Transmission Section 13

The third light transmission section 13 contains a resin matrix 7 and a light diffusing agent 6 contained in the matrix 7. The light diffusing agent 6 contained in the third light transmission section 13 is similar to the light diffusing agent 6 contained in the first light transmission section 4. In addition, the matrix 7 contained in the third light transmission section 13 is similar to the matrix 7 contained in the first light transmission section 4. Both sides of a top portion of the third light transmission section 13 are formed to have a chamfer-like shape. The thickness ($T_3$), the width ($W_3$) and the ratio ($T_3/W_3$) of the thickness ($T_3$) to the width ($W_3$) of the third light transmission section 13 are similar to those of the first light transmission section 4.

The average pitch of the third light transmission sections 13 is formed to be greater than the average pitch of the first light transmission sections 4. In the view angle-restricting sheet 11, due the average pitch of the third light transmission sections 13 being greater than the average pitch of the first light transmission sections 4, a view angle along one direction can be controlled predominantly by the first light transmission sections 4, and a view angle along other direction can be suitably controlled by the third light transmission sections 13.

Second Light Transmission Section 14

The second light transmission section 14 contains a transparent, in particular, colorless and transparent, synthetic resin as a principal component, since the second light transmission section 14 needs to transmit rays of light. The synthetic resin used as the principal component of the second light transmission section 14 is similar to the synthetic resin used as the principal component of the second light transmission section 5. Additives similar to those which may be added to the second light transmission section 5 may be added to the second light transmission section 14. The second light transmission section 14 includes a superficial layer portion 17 formed so as to cover the top portions 9 of the first light transmission sections 4 and the top portions 16 of the third light transmission sections 13. The second light transmission section 14 is integrally formed through the superficial layer portion 17. The thickness ($t_2$) of the superficial layer portion 17 is similar to the thickness of the superficial layer portion 10. In addition, the thickness ($T_2$), the ratio ($T_2/W_2$) of the thickness ($T_2$) to the width ($W_2$) of the second light transmission section 14, and the ratio ($W_2/W_1$) of the width ($W_2$) of the second light transmission section 14 to the width ($W_1$) of the first light transmission section 4, as well as the refractive index ($n_2$) of the second light transmission section 14 are similar to those of the second light transmission section 5.

Production Method

A method for producing the view angle-restricting sheet 11 is not particularly limited as long as a view angle-restricting sheet having the aforementioned structure can be produced, but the method for producing the view angle-restricting sheet 11 generally includes steps similar to those for the view angle-restricting sheet 1. Specifically, the step of providing each of the first light transmission sections 4 and the third light transmission sections 13 on the substrate layer 3 in a multi-stripe fashion includes steps of: (a) coating a material for forming a plurality of first light transmission sections 4 provided to protrude on the front face of the substrate layer 3 in a multi-stripe fashion and a material for forming a plurality of third light transmission sections 13; and (b) irradiating the material for forming the first light transmission sections 4 and the material for forming the third light transmission sections 13 with an ultraviolet ray or the like to allow curing thereof, and thereby providing the first light transmission sections 4 and the third light transmission sections 13. In addition, a process for coating the material for forming a plurality of first light transmission sections 4 and the material for forming a plurality of third light transmission sections 13 on the front face of the substrate layer 3 in the step (a) may be exemplified by well-known printing techniques such as gravure printing, flexography, silk-screen printing and offset lithography. In the view angle-restricting sheet 11, both sides of the top portion of the first light transmission section 4 and both sides of the top portion of the third light transmission section 13 can be formed to have a chamfer-like shape by coating the material for forming the first light transmission sections 4 and the material for forming the third light transmission sections 13 through such a technique.

According to the view angle-restricting sheet 11, since the optically functional layer 12 includes the third light transmission sections 13 provided crosswise with respect to the first light transmission section 4, the rays of light having entered from the back face side in a certain oblique direction with respect to the second light transmission section 14 are allowed to exit after being diffused by the first light transmission sections 4 and the third light transmission sections 13. Therefore, the view angle-restricting sheet 11 can remarkably reduce the possibility of the leakage of personal information and the like to the person seeing from the oblique direction.

Third Embodiment

View Angle-Restricting Sheet 21

Figure 5:
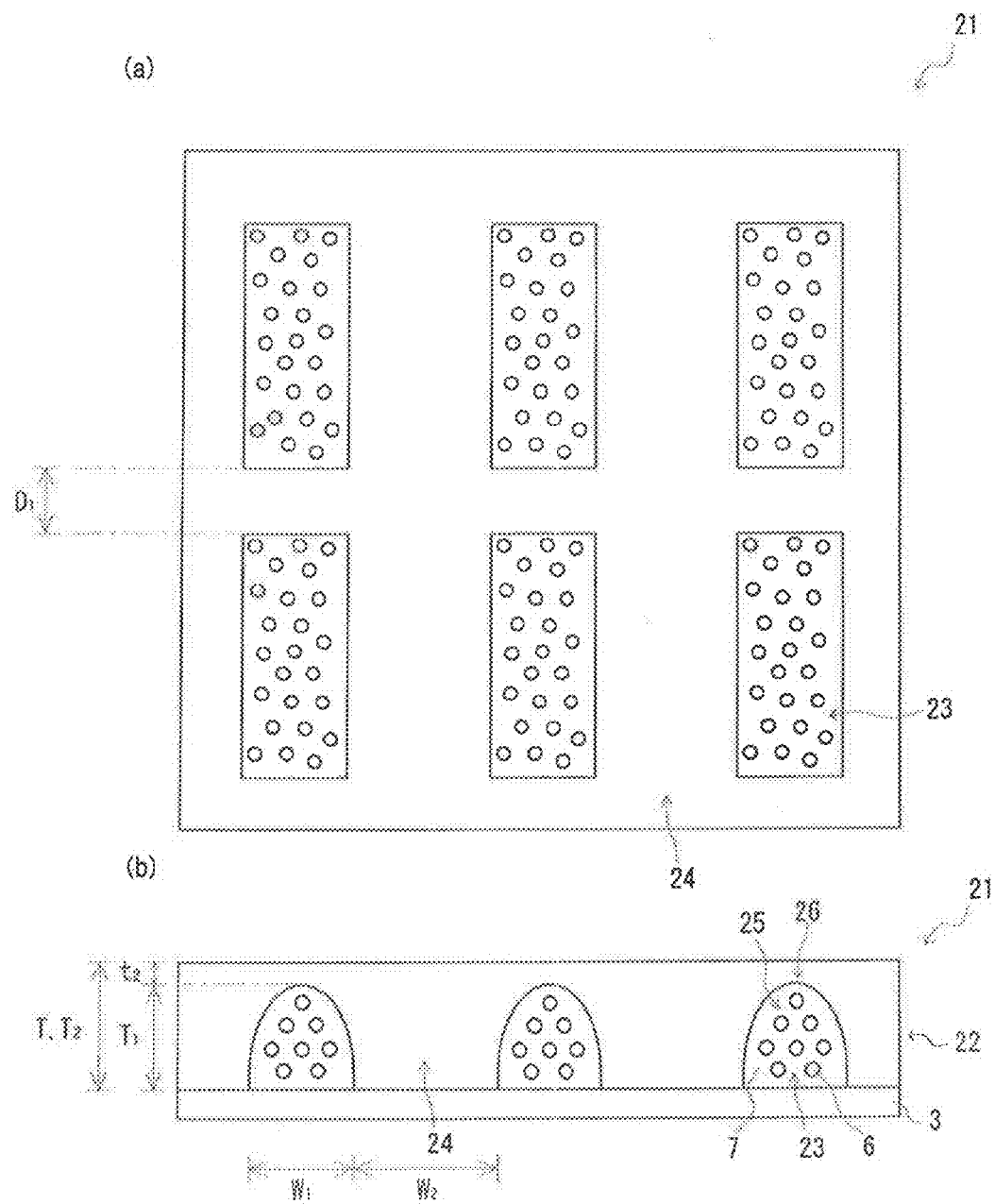
FIG. 5 is (a) a schematic plane cross sectional view and (b) a schematic cross sectional view each illustrating a view angle-restricting sheet according to an embodiment distinct from those shown in FIGS. 1 and 4.

A view angle-restricting sheet 21 shown in FIG. 5 includes an optical function layer 22 and a substrate layer 3. Since the substrate layer 3 in this embodiment is similar to the substrate layer 3 shown in FIG. 1, explanation thereof will be omitted through designating the identical number.

Optical Function Layer 22

The optical function layer 22 includes: a plurality of first light transmission sections 23 provided to protrude in a multi-stripe fashion; and a second light transmission section 24 disposed around the plurality of first light transmission sections 23. The front face and the back face of the optical function layer 22 are formed to be entirely flat. In the optical function layer 22, the first light transmission section 23 and the second light transmission section 24 are arranged without any gap. The thickness (T) of the optical function layer 22 is similar to the thickness of the optical function layer 2.

First Light Transmission Section 23

The first light transmission section 23 contains a resin matrix 7 and a light diffusing agent 6 contained in the matrix 7. The light diffusing agent 6 contained in the first light transmission section 23 is similar to the light diffusing agent 6 contained in the first light transmission section 4. The matrix 7 contained in the first light transmission section 23 is similar to the matrix 7 contained in the first light transmission section 4. In the optical function layer 22, the plurality of first light transmission sections 23 are arranged at a certain interval along the longitudinal direction and the width direction. Both sides of a top portion of the first light transmission section 23 are formed to have a chamfer-like shape. Both sides along the longitudinal direction and both sides along the width direction of the top portion 25 of the first light transmission section 23 are formed to have a chamfer-like shape. The thickness ($T_1$), the width ($W_1$), the ratio ($T_1/W_1$) of the thickness ($T_1$) to the width ($W_1$) of the first light transmission section 23 are similar to those of the first light transmission section 4.

The average pitch ($D_1$) of the first light transmission section 23 along the longitudinal direction is preferably, but not particularly limited to, no greater than an average pitch along the width direction. In the view angle-restricting sheet 21, when the average pitch ($D_1$) of the first light transmission section 23 along the longitudinal direction is no greater than the average pitch along the width direction, the quantity of the rays of light exiting from the front face side of the second light transmission section 24 substantially perpendicularly can be increased, and the view angle can be suitably controlled.

Second Light Transmission Section 24

The second light transmission section 24 contains a transparent, in particular, colorless and transparent, synthetic resin as a principal component, since the second light transmission section 24 needs to transmit rays of light. The synthetic resin used as the principal component of the second light transmission section 24 is similar to the synthetic resin used as the principal component of the second light transmission section 5. Additives similar to those which may be added to the second light transmission section 5 may be added to the second light transmission section 24. The second light transmission section 24 includes a superficial layer portion 26 formed so as to cover the top portions 25 of the first light transmission sections 23. The second light transmission section 24 is integrally formed through the superficial layer portion 26. The thickness ($t_2$) of the superficial layer portion 26 is similar to the thickness of the superficial layer portion 10. Moreover, the thickness ($T_2$) and the ratio ($T_2/W_2$) of the thickness ($T_2$) to the width ($W_2$) of the second light transmission section 24, and the ratio ($W_2/W_1$) of the width ($W_2$) of the second light transmission section 24 to the width ($W_1$) of the first light transmission section 23, as well as the refractive index ($n_2$) of the second light transmission section 24 are similar to those for the second light transmission section 5.

Production Method

A method for producing the view angle-restricting sheet 21 is not particularly limited as long as a view angle-restricting sheet having the aforementioned structure can be produced, but the method for producing the view angle-restricting sheet 21 generally includes steps similar to those for the view angle-restricting sheet 1.

In the view angle-restricting sheet 21, since the plurality of first light transmission sections 23 are arranged at a certain interval along the longitudinal direction, rays of light are allowed to exit from the interval portion toward the front face side substantially perpendicularly. Therefore, the view angle-restricting sheet 21 can serve to display a still more favorable image to a person seeing from the front face direction.

Fourth Embodiment

Touchscreen 31

Figure 6:
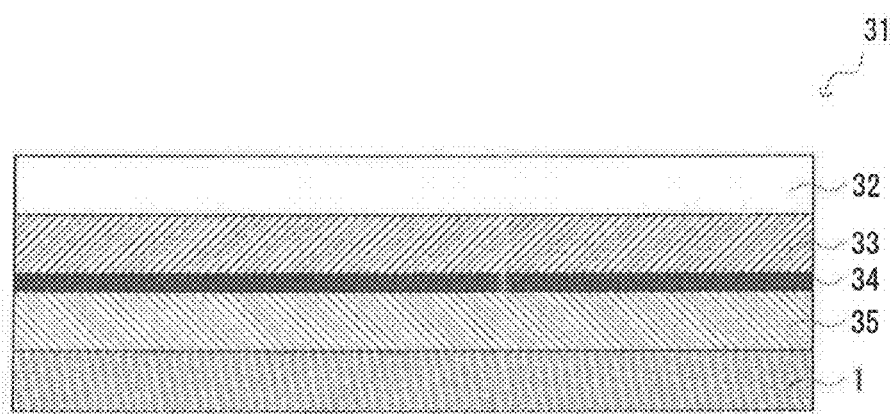
FIG. 6 is a schematic cross sectional view illustrating a touchscreen according to an embodiment of the present invention.

A touchscreen 31 shown in FIG. 6 includes a substrate 32, a transparent electrically conductive layer 33, a tacky layer 34, a substrate 35, and a view angle-restricting sheet 1. In this embodiment, the view angle-restricting sheet 1 is similar to the view angle-restricting sheet 1 shown in FIG. 1, and therefore explanation thereof will be omitted through designating the identical number. The touchscreen 31 is provided on the front face side of a display panel (not shown in the Figure). The touchscreen 31 allows an image light emitted from the display panel to exit toward the front face side. The touchscreen 31 is provided as a capacitive touchscreen.

The substrate 32 is made from a transparent insulating material. Specifically, the substrate 32 is provided as a glass substrate. The transparent electrically conductive layer 33 is made from an electrically conductive material having transparency and electric conductivity. A material for forming the transparent electrically conductive layer 33 is exemplified by an inorganic metal and an organic electrically conductive polymer. Examples of the inorganic metal include gold, silver, copper, platinum, nickel, tin oxide and indium tin oxide (ITO). Examples of the organic electrically conductive polymer include organic electrically conductive compositions containing polyaniline, polythiophene, polypyrrole, polyquinoxaline, and the like. Among these, ITO or a polythiophene-based material is preferred in light of favorable optical characteristics, appearance and electric conductivity. The tacky layer 34 provides adhesive bonding between the transparent electrically conductive layer 33 and the substrate 35. Although a material for forming the tacky layer 34 is not particularly limited, examples thereof include well-known tacky resins such as acrylic resins and urethane resins. The substrate 35 is a transparent insulating substrate and is provided as a glass substrate similarly to the substrate 32. The view angle-restricting sheet 1 is overlaid on the back face of the substrate 35. The view angle-restricting sheet 1 is overlaid on the back face of the substrate 35 via a tacky layer (not shown in the Figure). The view angle-restricting sheet 1 is arranged such that the longitudinal direction of the first light transmission section 4 is parallel to the vertical display direction of the touchscreen 31.

Since the view angle-restricting sheet 1 is provided on the front face side of the display panel, a sharp image can be displayed to the person seeing from the front direction, and the leakage of personal information and the like through glimmering from the oblique direction can be suitably prevented.

In the touchscreen 31, optical functions of the first light transmission section 4 and the second light transmission section 5 of the view angle-restricting sheet 1 differ from each other, and the transmission direction of the rays of light having entered the first light transmission section 4 can be altered. Therefore, the touchscreen 31 can display a sharp image to a person seeing from the front face side, using the rays of light having entered substantially perpendicularly to the optical function layer 2 of the view angle-restricting sheet 1 and passing through only the second light transmission section 5, and alter the transmission direction of the rays of light having entered the first light transmission section 4 to blur the image displayed to a person seeing from a certain direction, whereby the leakage of personal information and the like can be prevented.

Fifth Embodiment

View Angle-Restricting Sheet 41

Figure 7:
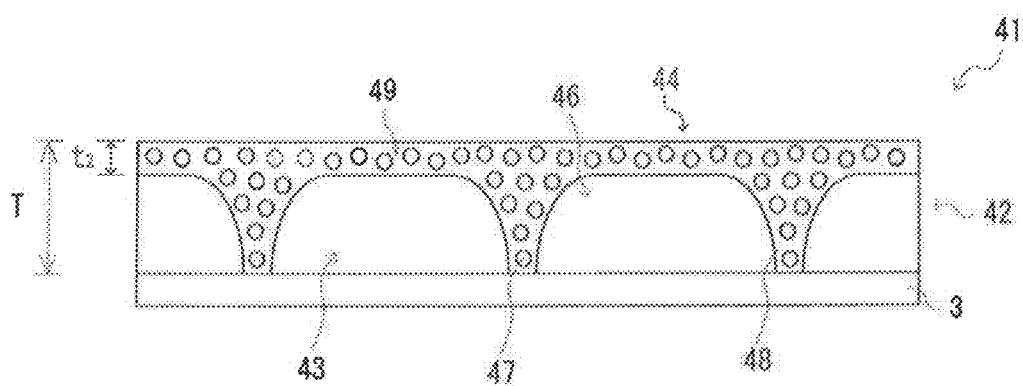
FIG. 7 is a schematic cross sectional view illustrating a view angle-restricting sheet according to an embodiment distinct from the view angle-restricting sheet shown in FIGS. 1, 4 and 5.

A view angle-restricting sheet 41 shown in FIG. 7 includes an optical function layer 42 and a substrate layer 3. Since the substrate layer 3 is similar to the substrate layer 3 shown in FIG. 1, explanation thereof will be omitted.

Optical Function Layer 42

The optical function layer 42 includes: a plurality of first light transmission sections 43 provided to protrude in a multi-stripe fashion; and a second light transmission section 44 disposed around the plurality of first light transmission sections 43. The first light transmission section 43 and the second light transmission section 44 are formed such that they each exhibit a distinct optical function. The front face and the back face of the optical function layer 42 are formed to be entirely flat. In the optical function layer 42, the first light transmission section 43 and the second light transmission section 44 are arranged without any gap between each other. The thickness (T) of the optical function layer 42 is similar to the thickness of the optical function layer 2.

First Light Transmission Section 43

Both sides of a top portion of the first light transmission section 43 are formed to have a chamfer-like shape. The first light transmission section 43 contains a transparent, in particular, colorless and transparent, synthetic resin as a principal component, since the first light transmission section 43 needs to transmit rays of light. The synthetic resin as the principal component of the first light transmission section 43 is exemplified by synthetic resins similar to exemplary principal components of the second light transmission section 5. In addition, additives similar to those which may be added to the second light transmission section 5 may be added to the first light transmission section 43.

Second Light Transmission Section 44

The second light transmission section 44 contains a resin matrix 48 and a light diffusing agent 47 contained in the matrix 48. As the light diffusing agent 47 contained in the second light transmission section 44, those similar to the light diffusing agent 6 contained in the first light transmission section 4 may be used. Moreover, as the matrix 48 contained in the second light transmission section 44, those similar to the matrix 7 contained in the first light transmission section 4 may be used.

The second light transmission section 44 includes a superficial layer portion 49 formed so as to cover a top portions 46 of the first light transmission sections 43. The second light transmission section 44 is integrally formed through the superficial layer portion 49. The thickness ($t_2$) of the superficial layer portion 49 is similar to the thickness of the superficial layer portion 10.

Production Method

A method for producing the view angle-restricting sheet 41 is not particularly limited as long as a view angle-restricting sheet having the aforementioned structure can be produced; similarly to the view angle-restricting sheet 1, an exemplary method for producing the view angle-restricting sheet 41 includes steps of: (1) providing a plurality of first light transmission sections 43 provided to protrude on the substrate layer 3 in a multi-stripe fashion; (2) applying, around the plurality of first light transmission sections 43, a material for forming the second light transmission section 46 that exhibits an optical function distinct from that of the first light transmission section; and (3) hardening the material for forming the second light transmission section 46 and thereby providing the second light transmission section 46.

Alternatively, an exemplary method for producing the view angle-restricting sheet 41 other than the method described above includes steps of: (1) providing the substrate layer 3 and a plurality of first light transmission sections 43 provided to protrude from the substrate layer 3 toward the front face side; (2) applying, around the first light transmission sections 43, a material for forming the second light transmission section 44 that exhibits an optical function distinct from that of the first light transmission section 43; and (3) hardening the material for forming the second light transmission section 44 and thereby providing the second light transmission section 44.

Specific examples of the step (1) include:

(a) a forming process that involves overlaying a synthetic resin on a sheet mold having a reversal shape of the front face of the substrate layer 3 and the first light transmission sections 43, and peeling the sheet mold;

(b) an injection molding process that involves injecting a molten resin into a die having a reversal shape of the front face of the substrate layer 3 and the first light transmission sections 43;

(c) a process that involves reheating a resin formed into a sheet, pressing the resin between a die similar to the die mentioned in (b) above and a metal plate, thereby transferring the shape;

(d) an extrusion sheet molding process that involves passing a resin in a molten state through a nip between a roll mold having a reversal shape of the front face of the substrate layer 3 and the first light transmission sections 43 therearound and other roll, thereby transferring the shape;

(e) a process that involves coating an ultraviolet ray-curable resin on the substrate layer 3, pressing the ultraviolet ray-curable resin onto a sheet mold, a die or a roll mold each having a reversal shape similar to that mentioned above to transfer the shape to the uncured ultraviolet ray-curable resin, and then irradiating the uncured ultraviolet ray-curable resin with an ultraviolet ray to cure the ultraviolet ray-curable resin;

(f) a process that involves coating an uncured ultraviolet ray-curable resin on a die or roll mold each having a reversal shape similar to that mentioned in (e) above to fill the die or roll mold therewith, followed by pressing and levelling with the substrate layer 3 in a sheet form, and then irradiating the ultraviolet ray-curable resin with an ultraviolet ray to cure the ultraviolet ray-curable resin; and the like.

Specific examples of the step (2) include a process that involves applying, around the plurality of first light transmission sections 43, the material for forming the second light transmission section 46 through a spin coating method, a blade coating method, a die coating method, and the like.

Specific examples of the step (3) include a process that involves drying the material for forming the second light transmission section 46 disposed around the plurality of first light transmission sections 43, thereafter irradiating the material for forming the second light transmission section 46 with an ultraviolet ray or the like to allow curing thereof, thereby providing the second light transmission section 46 having a predetermined thickness.

In the view angle-restricting sheet 41, since the second light transmission section 44 contains the resin matrix 48 and the light diffusing agent 47 contained in the matrix 48, the rays of light having entered from the back face side in a certain oblique direction with respect to the first light transmission section 43 are allowed to exit after being diffused by the second light transmission section 44. On the other hand, the view angle-restricting sheet 41 allows the rays of light having entered from the back face side substantially perpendicularly to the first light transmission section 43 to exit from the front face side of the first light transmission section 43 substantially perpendicularly. Therefore, the view angle-restricting sheet 41 can display a sharp image to a person seeing from the front direction, and can prevent the leakage of personal information and the like to a person seeing from the oblique direction by blurring the image displayed. In addition, in the view angle-restricting sheet 41, since both sides of the top portion of the first light transmission section 43 are formed to have a chamfer-like shape, and the second light transmission section 44 is disposed around the plurality of first light transmission sections 43, an anti-glare function is imparted by the upper portion of the second light transmission section 44. As a result, the view angle-restricting sheet 41 can prevent a reduction in visibility caused by the reflection of rays of light from outside and/or the reflected glare of an image, by diffusing rays of light from outside.

In the view angle-restricting sheet 41, since the second light transmission section 44 includes the superficial layer portion 49 formed so as to cover the top portions 46 of the first light transmission sections 43, and is integrally formed through the superficial layer portion 49, the moldability, the strength, the shape stability, and the like can be improved. In addition, the view angle-restricting sheet 41 enables the anti-glare function to be further improved owing to the superficial layer portion 49.

Sixth Embodiment

Touchscreen 51

Figure 8:
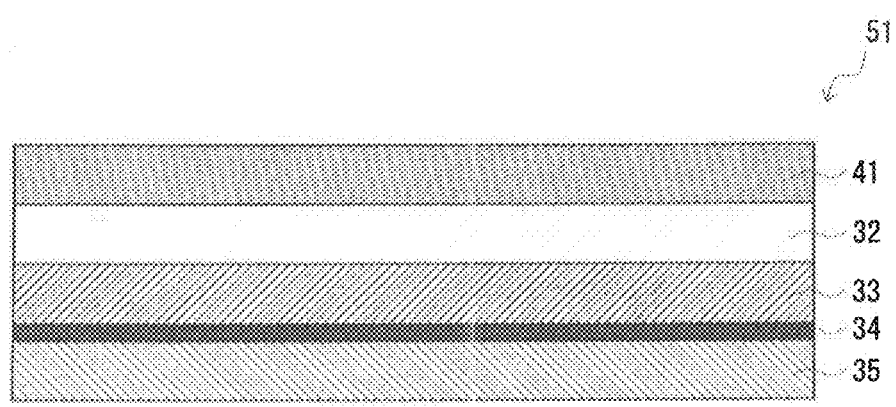
FIG. 8 is a schematic cross sectional view illustrating a touchscreen according to an embodiment distinct from the touchscreen shown in FIG. 6.

A touchscreen 51 shown in FIG. 8 includes a view angle-restricting sheet 41, a substrate 32, a transparent electrically conductive layer 33, a tacky layer 34, and a substrate 35. In this embodiment, the view angle-restricting sheet 41 is similar to the view angle-restricting sheet 41 shown in FIG. 7, and the substrate 32, the transparent electrically conductive layer 33, the tacky layer 34 and the substrate 35 are similar to those of the touchscreen 31 shown in FIG. 6; therefore, explanation thereof will be omitted through designating the identical numbers. The touchscreen 51 is provided on the front face side of a display panel (not shown in the Figure). The touchscreen 51 allows an image light emitted from the display panel to exit toward the front face side. The touchscreen 51 is provided as a capacitive touchscreen. The view angle-restricting sheet 41 is arranged such that the longitudinal direction of the first light transmission section 43 is parallel to the vertical display direction of the touchscreen 51.

Since the view angle-restricting sheet 41 is provided on a front face side of a display panel, a sharp image can be displayed to the person seeing from the front direction, and the leakage of personal information and the like through glimmering from the oblique direction can be suitably prevented.

In the touchscreen 51, optical functions of the first light transmission section 43 and the second light transmission section 44 of the view angle-restricting sheet 41 differ from each other, and the transmission direction of the rays of light having entered the second light transmission section 44 can be altered. Therefore, the touchscreen 51 enables a sharp image to be displayed to a person seeing from the front face side, using the rays of light having entered from the back face side of the first light transmission section 43 substantially perpendicularly and exiting from the front face side of the first light transmission section 43 substantially perpendicularly, and the image displayed to a person seeing from a certain direction to be blurred by altering the transmission direction of the rays of light having entered the second light transmission section 44, whereby the leakage of personal information and the like can be prevented.

In the touchscreen 51, since the second light transmission section 44 of the view angle-restricting sheet 41 is disposed around the plurality of first light transmission sections 43, an anti-glare function may be imparted by the second light transmission section 44 disposed adjacent both sides of the top portion of the first light transmission section 43. In particular, since the second light transmission section 44 of the view angle-restricting sheet 41 includes the superficial layer portion 49, the anti-glare function of the touchscreen 51 can be further improved.

Other Embodiments

It is to be noted that the view angle-restricting sheet and the flat panel display that includes the view angle-restricting sheet, as well as the production method of the view angle-restricting sheet according to the embodiments of the present invention may be carried out in various modified or improved embodiments, in addition to the embodiments described above.

For example, according to the view angle-restricting sheet, the substrate layer and the superficial layer portion of the second light transmission section may or may not be incorporated in accordance with an arbitrary selection.

According to the view angle-restricting sheet, the first light transmission section and the second light transmission section may not necessarily contain a synthetic resin, and may be a hollow section containing air.

According to the view angle-restricting sheet, the front face and/or the back face of the optically functional layer may not be entirely flat. According to the view angle-restricting sheet, visibility from the front direction, a view angle and the like can be adjusted, for example, by changing the thickness of the first light transmission section and the thickness of the second light transmission section. According to the view angle-restricting sheet, other layer(s) may be overlaid between the substrate layer and the optically functional layer. According to the view angle-restricting sheet, the first light transmission sections and/or the third light transmission sections may not necessarily be arranged at regular intervals.

In the view angle-restricting sheet, the first light transmission sections and the third light transmission sections may not be necessarily provided so as to cross each other substantially at a right angle. In addition, the view angle-restricting sheet may be formed such that an average pitch between adjacent third light transmission sections is similar in length to an average pitch between adjacent first light transmission sections. In such an embodiment, the view angle-restricting sheet can further enhance the effect of preventing the leakage of personal information and the like through glimmering from the oblique direction.

The view angle-restricting sheet can be provided on various types of touchscreens other than the capacitive touchscreen, such as a resistive touchscreen and an electromagnetic inductive touchscreen. Even in a case where the view angle-restricting sheet is provided on the touchscreen, the view angle-restricting sheet may not necessarily be provided such that the longitudinal direction of the first light transmission section and the vertical display direction of the touchscreen are parallel to each other. The view angle-restricting sheet may not necessarily be attached on a touchscreen, and may be provided on the front face side of a display panel of various flat panel displays such as liquid crystal displays, plasma displays and organic EL displays.

EXAMPLES

Hereinafter, the present invention will be explained in more detail by way of Examples, but the present invention should not in any way be construed to be limited by these Examples.

Example 1

An acrylic resin was fed to a T die, and then subjected to extrusion molding to form an extruded article in a sheet form for forming a second light transmission section. Further, the extruded article was passed through a nip between a roll mold having a reversal shape of the front face side of first light transmission sections therearound and other roll, and cured, thereby forming a second light transmission section including a plurality of depressed parts on one side. Separately, a coating liquid was prepared that contained: a material for forming a matrix that contained a polyfunctional urethane (meth)acrylate and tin-containing indium oxide particles (ITO) (average primary particle size: 30 nm); and a light diffusing agent (acrylic resin beads; mean particle size of 5 μm) contained in a mass ratio of 0.4 with respect to the material for forming a matrix. Thereafter, the coating liquid was applied to the plurality of depressed parts of the second light transmission section, dried at 80° C., and irradiated with an ultraviolet ray to allow curing thereof. Thus, a view angle-restricting sheet of Example 1 was obtained that included a plurality of first light transmission sections provided to protrude in a multi-stripe fashion, and the second light transmission section 5 disposed around the plurality of first light transmission sections.

Examples 2 to 8

View angle-restricting sheets according to Examples 2 to 8 were obtained in a similar manner to Example 1 except that the ratio ($T_1/W_1$) of the thickness ($T_1$) of the first light transmission section to the width ($W_1$) on the back face side of the first light transmission section, the width ($W_2$) on the back face side of the second light transmission section, and the ratio ($W_2/W_1$) of the width ($W_2$) on the back face side of the second light transmission section to the width ($W_1$) on the back face side of the first light transmission section shown in Table 1 were attained.

Comparative Example 1

An acrylic resin was fed to a T die, and then subjected to extrusion molding to form an extruded article in a sheet form for forming a second light transmission section. Separately, a coating liquid was prepared that contained a polyfunctional urethane (meth)acrylate, and a black pigment (carbon black) as a light absorbing material contained in a proportion of 35 parts by mass with respect to 100 parts by mass of the polyfunctional urethane (meth)acrylate. Thereafter, the coating liquid was coated on the front face of the extruded article, dried at 80° C., and irradiated with an ultraviolet ray to allow curing thereof, and thereby a laminate that included a first light transmission section and a second light transmission section. Next, laminates having a structure similar to that of the laminate formed above were overlaid and bonded sequentially to form a multilayered article in which the first light transmission sections and the second light transmission sections were sequentially overlaid. Then, the multilayered article was cut at a predetermined interval along the perpendicular direction to obtain a view angle-restricting sheet according to Comparative Example 1.

Evaluations of Characteristics

The view angle-restricting sheets according Examples 1 to 8 and Comparative Example 1 were each overlaid on the front face of a substrate of a touchscreen, and a view angle characteristic and a luminance characteristic were evaluated. In addition, as Comparative Example 2, the view angle characteristic and the luminance characteristic in the case of not using any view angle-restricting sheet were evaluated.

The evaluation of the view angle characteristic was made as follows based on the visibility of the displayed image in visual inspection from the oblique direction (0°±45°) when a backlight was turned on:

(a) "A" in a case where the displayed image could be hardly discriminated;

(b) "B" in a case where the displayed image could be vaguely discriminated; and (c) "C" in a case where the displayed image could be clearly discriminated.

The results are shown in Table 1.

The evaluation of the luminance characteristic was made as follows based on the visibility of the displayed image in visual inspection from the front direction (0°±5°) when a backlight was turned on:

(a) "A" in a case where a reduction in luminance was not found, and an image displayed on a display screen was seen sharply;

(b) "B" in a case where a reduction in luminance was not found, but an image displayed on a display screen was seen accompanied by somewhat blurring;

(c) "C" in a case where a reduction in luminance was found to some extent, and an image displayed on a display screen was seen accompanied by somewhat blurring; and (d) "D" in a case where a reduction in luminance was found. The results are shown in Table 1.

TABLE 1

| | View angle-restricting sheet | | | | | | | | | | |
|---|---|---|---|---|---|---|---|---|---|---|---|
| | | | first light transmission section | | | | | second light transmission section | | ratio ($W_2/W_1$) of width ($W_2$) on back face side of second light transmission section to width ($W_1$) on back face side of first light transmission section | | |
| | average thickness ($\mu m$) | thickness ($T_1$) ($\mu m$) | ratio ($T_1/W_1$) of thickness ($T_1$) to width ($W_1$) on back face side | refractive index ($n_1$) of matrix | refractive index ($n_1$) of light diffusing agent | mean particle size of light diffusing agent ($\mu m$) | mass ratio of light diffusing agent to matrix | width ($W_2$) on back face side ($\mu m$) | refractive index ($n_2$) | | View angle characteristic | Luminance characteristic |
| Example 1 | 40 | 35 | 1 | 1.68 | 1.49 | 5 | 0.4 | 50 | 1.49 | 1.4 | A | B |
| Example 2 | 40 | 35 | 2 | 1.68 | 1.49 | 5 | 0.4 | 50 | 1.49 | 2.9 | A | A |
| Example 3 | 40 | 35 | 0.7 | 1.68 | 1.49 | 5 | 0.4 | 50 | 1.49 | 1 | A | B |
| Example 4 | 40 | 35 | 3 | 1.68 | 1.49 | 5 | 0.4 | 50 | 1.49 | 4.3 | B | A |
| Example 5 | 40 | 35 | 0.4 | 1.68 | 1.49 | 5 | 0.4 | 50 | 1.49 | 0.6 | A | C |
| Example 6 | 40 | 35 | 4.5 | 1.68 | 1.49 | 5 | 0.4 | 50 | 1.49 | 6.4 | B | A |
| Example 7 | 40 | 35 | 1.5 | 1.68 | 1.49 | 5 | 0.4 | 15 | 1.49 | 0.6 | A | C |
| Example 8 | 40 | 35 | 1.5 | 1.68 | 1.49 | 5 | 0.4 | 150 | 1.49 | 6.4 | B | A |
| Comparative Example 1 | 150 | 150 | 20 | — | — | — | — | 50 | 1.49 | 6.7 | A | D |
| Comparative Example 2 | — | — | — | — | — | — | — | — | — | — | C | A |

As shown in Table 1 set forth above, when the view angle-restricting sheets according to Examples 1 to 8 were used, the requirement of the view angle characteristic was satisfied and a superior luminance characteristic was also exhibited, as compared with those according to Comparative Examples 1 and 2.

As set forth above, the view angle-restricting sheet and the flat panel display that includes the view angle-restricting sheet according to the present invention enable the leakage of personal information and the like through glimmering from an oblique direction to be suitably prevented and a reduction in front face luminance to be inhibited; therefore, these can be suitably used in various flat panel displays such as liquid crystal displays, plasma displays and organic EL displays.

EXPLANATION OF THE REFERENCE SYMBOLS 1 view angle-restricting sheet
2 optical function layer
3 substrate layer
4 first light transmission section
5 second light transmission section
6 light diffusing agent
7 matrix
9 top portion
10 superficial layer portion
11 view angle-restricting sheet
12 optical function layer
13 third light transmission section
14 second light transmission section
16 top portion
17 superficial layer portion
21 view angle-restricting sheet
22 optical function layer
23 first light transmission section
24 second light transmission section
25 top portion
26 superficial layer portion
31 touchscreen
32 substrate
33 transparent electrically conductive layer
34 tacky layer
35 substrate
41 view angle-restricting sheet
42 optical function layer
43 first light transmission section
44 second light transmission section
46 top portion
47 light diffusing agent
48 matrix
49 superficial layer portion
51 touchscreen

The invention claimed is:

1. A view angle-restricting sheet comprising an optical function layer which comprises:
a plurality of first light transmission sections provided in a multi-stripe fashion; and
a second light transmission section disposed around the plurality of first light transmission sections, wherein
a top portion of the first light transmission section is formed to be rounded on both sides in a width direction,
the first light transmission section exhibits an optical function distinct from an optical function of the second light transmission section,
the first light transmission section comprises a resin matrix and a light diffusing agent comprised in the matrix,
the light diffusing agent is resin beads, a refractive index ($n_1$) of a resin composition forming the matrix is greater than a refractive index ($n_3$) of the resin beads, and a difference between the refractive index ($n_1$) of the resin composition forming the matrix and the refractive index ($n_3$) of the resin beads is no less than 0.06,
the refractive index ($n_1$) of the resin composition forming the matrix is greater than a refractive index ($n_2$) of the second light transmission section, and a difference ($n_1-n_2$) between the refractive index ($n_1$) of the resin composition forming the matrix and the refractive index ($n_2$) of the second light transmission section is no less than 0.15, and
a mass ratio of the light diffusing agent to the matrix is no less than 0.1 and no greater than 0.5.

2. The view angle-restricting sheet according to claim 1, wherein at least the top portion of the first light transmission section has an inverted-U shaped vertical cross section.

3. The view angle-restricting sheet according to claim 1, wherein the matrix is formed using an ionizing radiation-curable resin.

4. The view angle-restricting sheet according to claim 1, wherein a ratio ($T_1/W_1$) of a thickness ($T_1$) of the first light transmission section to a width ($W_1$) on a back face side of the first light transmission section is no less than ½ and no greater than 4.

5. The view angle-restricting sheet according to claim 1, wherein a ratio ($W_2/W_1$) of a width ($W_2$) on a back face side of the second light transmission section to a width ($W_1$) on a back face side of the first light transmission section is no less than 1 and no greater than 4.

6. The view angle-restricting sheet according to claim 1, wherein a width ($W_2$) on a back face side of the second light transmission section is no less than 10 μm and no greater than 200 μm.

7. The view angle-restricting sheet according to claim 1, wherein the second light transmission section is integrally formed so as to cover top portions of the first light transmission sections.

8. The view angle-restricting sheet according to claim 1, wherein the view angle-restricting sheet further comprises a substrate layer overlaid on a back face side thereof composed of the first light transmission section and the second light transmission section.

9. A flat panel display comprising:
a display panel; and
the view angle-restricting sheet according to claim 1 provided on a front face side of the display panel.

* * * * *